Nov. 5, 1963  R. E. SELTZER  3,109,362
MECHANICAL BALER AND CONTROL ARRANGEMENT THEREFOR
Filed Jan. 24, 1961  4 Sheets-Sheet 1
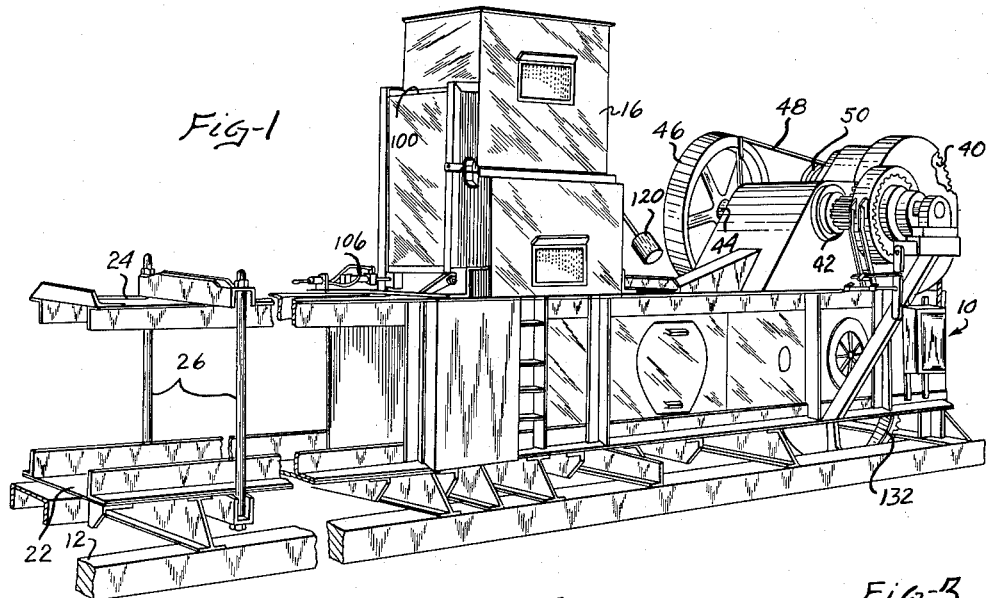
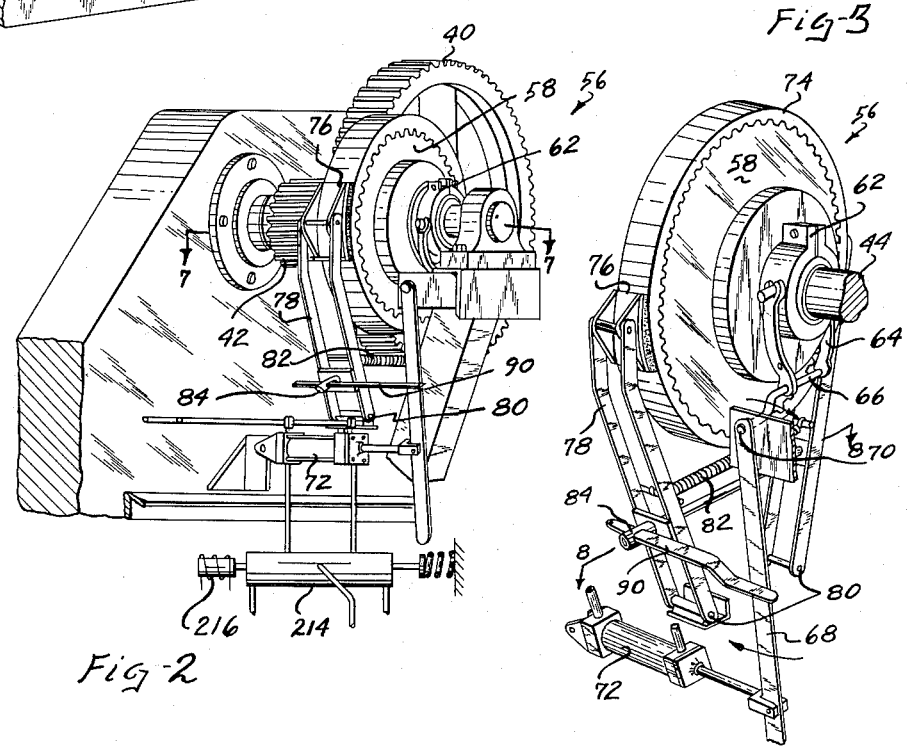
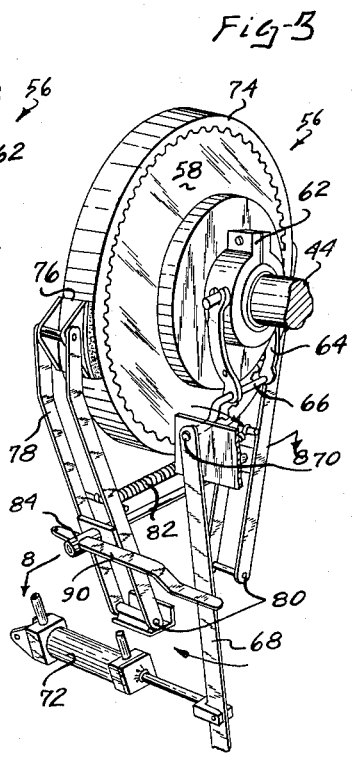
INVENTOR.
ROBERT E. SELTZER
BY
*Toulmin & Toulmin*
ATTORNEYS Nov. 5, 1963   R. E. SELTZER   3,109,362
MECHANICAL BALER AND CONTROL ARRANGEMENT THEREFOR
Filed Jan. 24, 1961   4 Sheets-Sheet 2
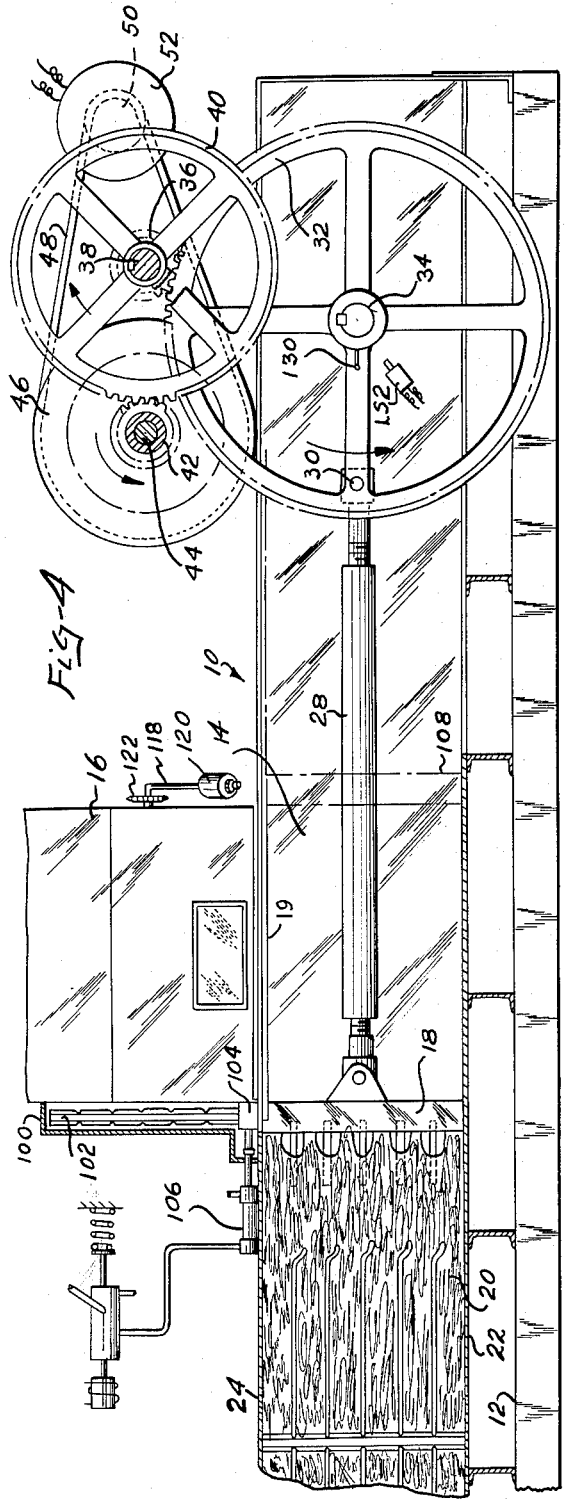
INVENTOR.
ROBERT E SELTZER
BY Toulmin & Toulmin
ATTORNEYS

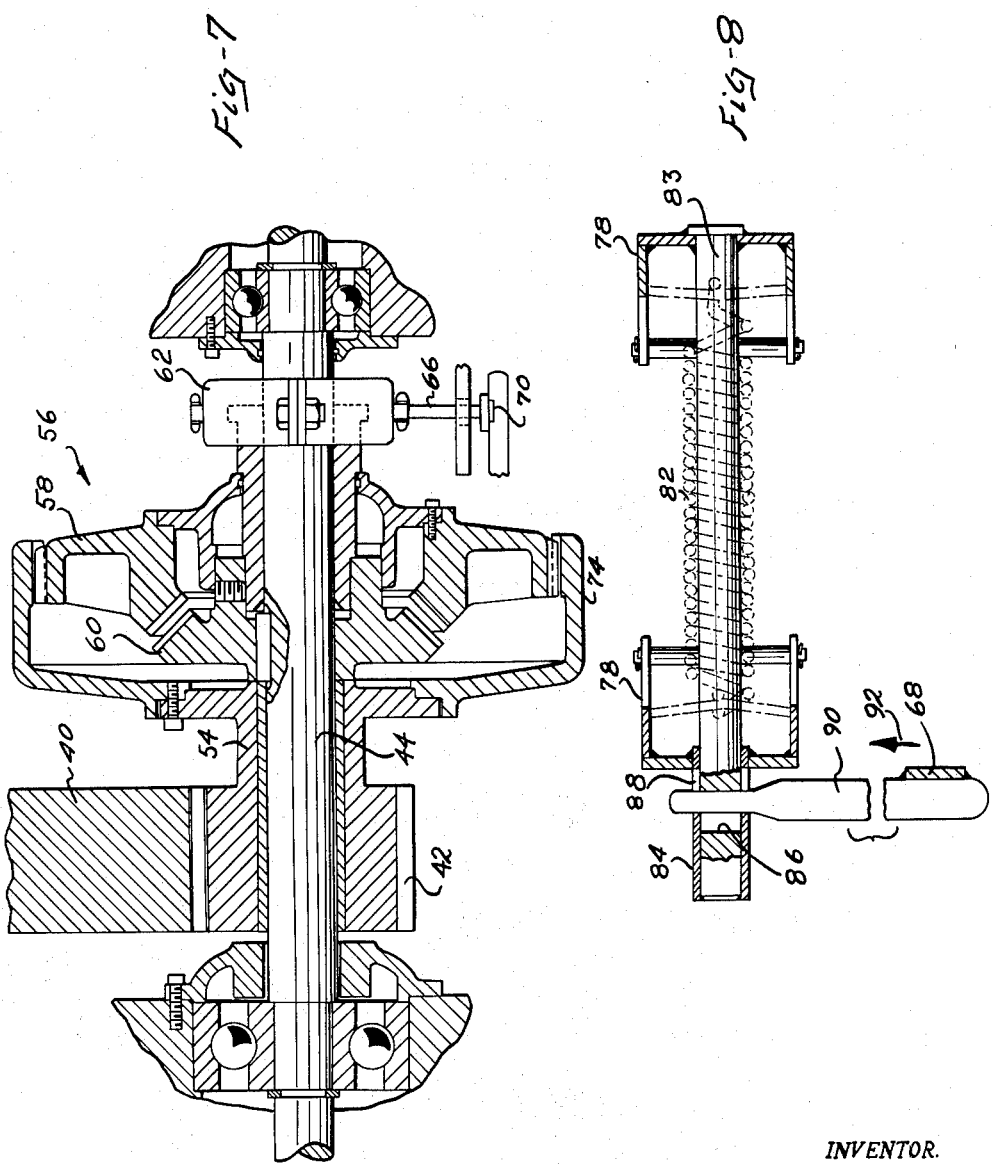

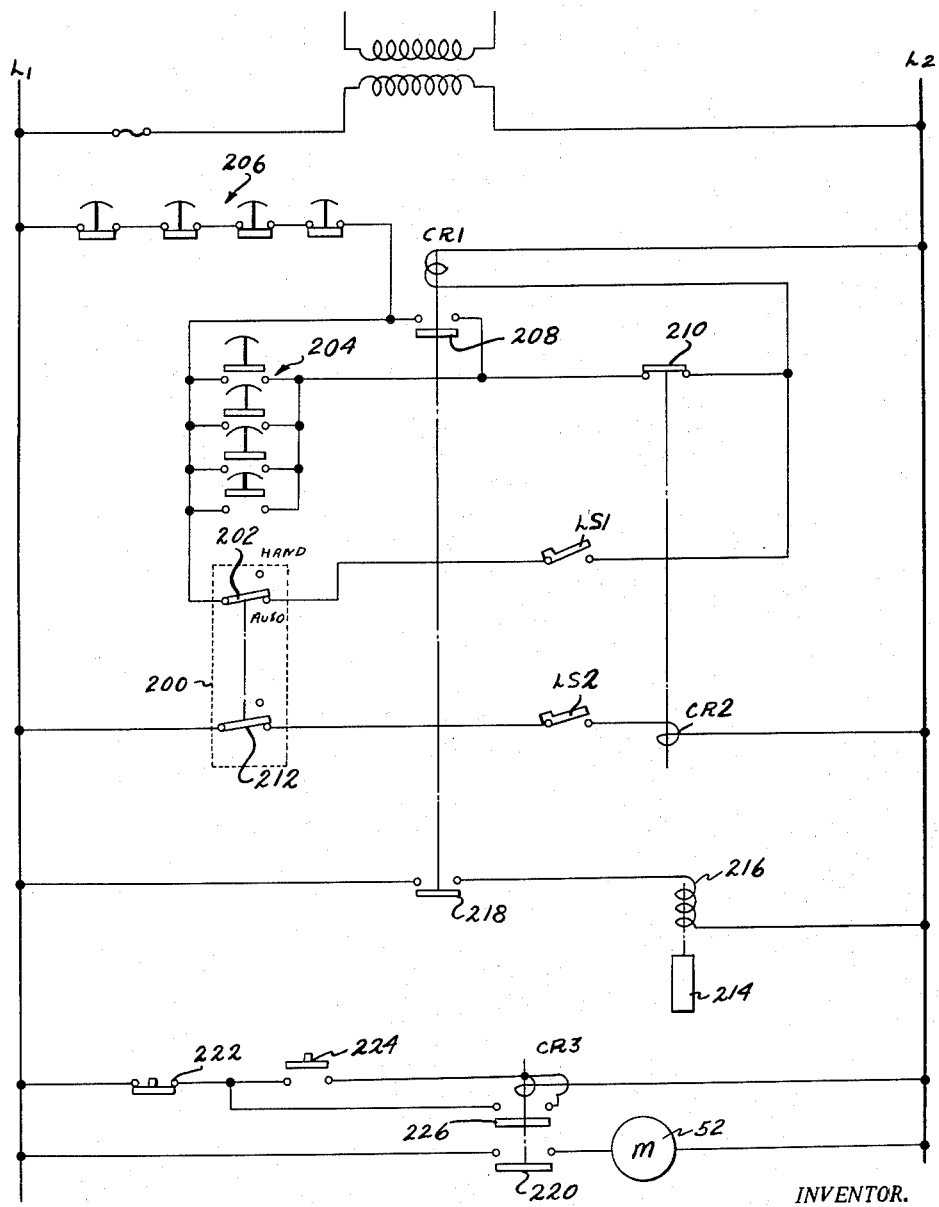

3,109,362
Patented Nov. 5, 1963

3,109,362
MECHANICAL BALER AND CONTROL
ARRANGEMENT THEREFOR
Robert E. Seltzer, Bellevue, Ohio, assignor to The American Baler Company, Bellevue, Ohio, a corporation of Ohio
Filed Jan. 24, 1961, Ser. No. 84,683
9 Claims. (Cl. 100—49)

This invention relates to baling machines and is particularly concerned with a baling machine of the type utilized for baling industrial waste such as paper and cardboard and metal scrap.

Balers of the general nature with which the present invention is concerned are known and are widely employed in industry for compacting waste materials into bales which can easily be transported.

The present inventon has as an object the provision of a baling machine of the nature referred to having improved operating characteristics.

Another object of this invention is the provision of a baling machine having simplified controls whereby the machine can be incorporated in an automatic system and requires only a minimum amount of attention.

A still further object of this invention is the provision of a mechanical baler that does not require an operator's attention, except for the insertion of divider blocks in the machine and the banding of the bales.

These and other objects and advantages will become more apparent upon reference to the drawings in which:

FIGURE 1 is a perspective view showing a baling machine according to my invention;

FIGURE 2 is a perspective view showing a portion of the drive of the baling machine at enlarged scale;

FIGURE 3 is a view similar to FIGURE 2 showing the manner in which the clutch and brake forming a part of the drive train are operated;

FIGURE 4 is a longitudinal section through the baling machine showing details of construction thereof;

FIGURE 5 is a view looking in from the rear side from the feed hopper for the machine showing the manner in which the gates disposed in the hopper control the supply of the material from the hopper to the baling chamber;

FIGURE 6 is a view like FIGURE 5 which shows the hopper in section and illustrates the gates in elevation;

FIGURE 7 is a sectional view through the drive clutch for the baling machine and is indicated by line 7—7 on FIGURE 2;

FIGURE 8 is a sectional view showing the brake actuating mechanism and is illustrated by line 8—8 on FIGURE 3; and FIGURE 9 is a diagrammatic representation of the electrical control circuit for controlling the operation of the machine.

Referring to the drawings more in detail and with particular reference to FIGURES 1 through 6, the baling machine comprises a frame 10 that may include supporting skid means 12 by means of which the baling machine may be transported and supported at a place of use.

Within frame 10 of the baling machine, as will best be seen in FIGURE 4, there is a compacting or baling chamber 14 to which material to be baled is delivered from hopper 16 extending upwardly therefrom. The material that is delivered into compression chamber or baling chamber 14 is acted upon by a bailing head 18 reciprocable therein which pushes the material, as indicated at 20, leftwardly through the baling or compression chamber into the left end of the frame. The left end of the frame comprises a bottom wall 22 and an upper wall 24 interconnected by tension rods 26 which can be adjusted to provide any desired degree of resistance to movement of the material being baled through the frame of the machine thereby to provide for the desired degree of compacting thereof.

The baling head 18 is connected by an adjustable drag link 28 with a pivot pin 30 extending between a pair of large gears 32 mounted on a shaft means 34 toward the right end of frame 10. Each of gears 32 meshes with a drive pinion 36 which pinions are keyed to a shaft 38 extending transversely of the frame 10 above gears 32. On one end of shaft 38 is a drive gear 40 that meshes with a pinion 42 rotatably mounted on a shaft 44 and under the control of a clutch and brake to be described hereinafter.

Shaft 44 extends transversely of the machine and at the end on the far side of the machine supports a flywheel 46 that is driven by belt means 48 that pass over the pulley 50 mounted on the output shaft of an electric motor 52.

Returning now to the pinion 42 and its connection with shaft 44, this will be seen in FIGURE 7. In FIGURE 7, it will be noted that pinion 42 is integral with the hub 54 of a clutch generally indicated at 56 and which hub has drivingly connected therewith one clutch part 58. Clutch part 58 is adapted for selective engagement by another clutch part 60 that is keyed to shaft 44. Movement of clutch parts 58 and 60 relatively into driving engagement is accomplished by axial movement of a collar 62 which is under the control of shifting mechanism that is best seen in FIGURES 2 and 3.

In these figures, it will be noted that the collar 62 is engaged by a fork 64 mounted on a bent actuating rod 66 attached to the upper end of a lever 68. Pivot means at 70 are provided for the rod so that movement of the lever will cause swinging movement of the offset portion of rod 66 and the fork 64 thereby to shift collar 62 axially to move clutch part 60 relative to clutch part 58 to bring about engagement and disengagement of the said clutch parts.

A fluid motor 72, in this case a pneumatic motor, is connected with lever 68 for moving it in its opposite directions.

Also, associated with the portion of the clutch to which pinion 42 is keyed is a cylindrical part 74 that has positioned adjacent the periphery thereof at opposite sides the brake shoes 76. Brake shoes 76 are mounted on the upper ends of arms 78 that have their lower ends pivoted at 80 to stationary supports.

A tension spring 82 extends between the arms and urges them toward each other and thus into braking engagement with cylindrical surface 74.

The arms are provided with an operating mechanism so that the arms are closed in braking engagement with the cylindrical surface 74 on the clutch housing when the clutch is released and are disengaged from the clutch housing when the clutch parts are engaged.

This is accomplished, as will be seen, in FIGURE 8 by attaching a rod 83 to one of the arms 78 and extending it through the other of the arms 78 and into a sleeve 84 carried by the said other arm. There is provided slot means 86 in rod 83 and slot means 88 in sleeve 84 into which slot means there extends a cam bar 90. Cam bar 90 is connected with clutch operating lever 68 so that when clutch operating lever 68 moves in its clutch engaging direction, and which is in the direction of arrow 92, the cam bar 90 will have its wider portion thrust in between the left side of the slot in sleeve 84 (FIGURE 8) and the right side of the slot in rod 83 and thus will urge rod 83 rightwardly relative to sleeve 84 and thus brings about separating movement of the arms 78 and releasing of the brake from the clutch.

The rotation and halting of the drive mechanism and the movement of the baling head is thus controlled at all times.

Mounted on the left side of hopper 16, as it is viewed in FIGURES 1 and 4, is a box 100 into which there is placed a divider board or block 102 that is to be dropped between successive bales. This block is supported on a support member 104 that can be manually retracted or retracted by actuation of a hydraulic or pneumatic motor 106 to permit the block to drop vertically downwardly. The block is dropped when the baling head has been retracted to its dotted-line position 108.

As to hopper 16 itself, reference to FIGURES 5 and 6 will show that the hopper comprises a feed chute portion 110 through which the material to be baled is delivered downwardly. The feed chute portion is separated from the portion 112 that is directly connected with frame 10 above the baling chamber by a pair of gates 114 mounted on shafts 116. The gates are movable between the horizontal position where they will prevent downward movement of the material into vertical position in which they are illustrated in FIGURE 6, in which they permit material to pass into the baling chamber from the hopper.

To control the movement of the gates, each shaft 116 has an arm 118 attached thereto which adjustably carries a counterweight 120. The counterweights 120 are so arranged that they pass beyond the horizontal as the gates open thus permitting full opening of the gates when the weight of the material resting thereon equals a predetermined amount.

For causing operation of the gates in unison, each shaft 116 has thereon a sprocket 122 and a chain 124 connects the sprockets for synchronous rotation in respect to opposite directions. Chain 124 is also availed of for exercising a controlling function which can be accomplished by passing the chain around an idler sprocket 126 that has associated therewith an actuator 128 for controlling a limit switch LS1.

It will be apparent that other means could be employed for interconnecting the shafts 116 to rotate in unison in respectively opposite directions and that other means could be provided for operating the limit switch LS1 in response to movements of the gates.

Control of the baling machine is had by way of the electric circuit illustrated in FIGURE 9 and which circuit includes, in addition to the limit switch LS1 referred to above that is actuated when the gates are opened, a limit switch LS2 which is actuated by a cam 130 on one of shaft means 34 when the baling head 18 is being retracted.

FIGURE 9 shows one form which the electric control circuit for controlling the operation of the baling machine can take.

In FIGURE 9, there is connected between power lines L1 and L2 the energizing coil of a relay CR1, the said coil being in series with the aforementioned normally open gate switch LS1, which is connected to the "automatic" terminal of one portion of a hand-automatic switch 200 which has a blade 202 pertaining to the said contact that is connected with one side of each of a group of start switches 204.

This same side of the start switches is connected through the serially arranged stop switches 206 with power line L1. The same line and the other side of the start switches 204 are connected to terminals under the control of blade 208 of relay CR1. The said other side of the start switches is also connected through a normally closed blade 210 of a relay CR2 with the side of the energizing coil of relay CR1 opposite its connection of line L2.

Also, connected between lines L1 and L2 is the energizing coil of relay CR2 which is in series with normally open limit switch LS2 that is under the control of cam 130 on shaft 34. The side of limit switch LS2 opposite its connection with the coil of relay CR2 is connected with one terminal of another portion of the hand-automatic switch 200 and the blade of this portion of the hand-automatic switch is connected with power line L1.

This blade is indicated at 212. The valve 214 controlling motor 72 has associated therewith an actuating solenoid 216 in series with a normally open blade 218 of relay CR1.

The drive motor 52 for the baler is in circuit with a normally open blade 220 of a relay CR3 the energizing coil of which is in circuit with a normally closed stop switch 222 and a normally open start switch 224, the latter being bypassed by blade 226 of relay CR3.

In operation, the baler may be started by closing switch 224 which will energize relay CR3 and set motor 52 into operation.

Reciprocation of the baling head can be had by closing any of switches 204 which will bring about energization of relay CR1 thereby closing its blades 208 and 218 and energizing solenoid 216 of the air valve 214 thereby to release the brake and to close the clutch, completing the drive train in the motor to the baling head.

If the switch 200 is adjusted to manual position, the baling head will continue to reciprocate until at least one of switches 206 is opened.

If, on the other hand, switch 200 is adjusted to the automatic position, in which it is shown in FIGURE 9, the baling head will advance from its retracted position to its fully advanced position and will then retract until cam 130 trips limit switch LS2 which will bring about energization of relay CR2 which will open the holding circuit to the coil of relay CR1 thus deenergizing this relay and permitting its blade 218 to open thus deenergizing the solenoid 216 for the air valve and opening the drive clutch while simultaneously closing the brake.

Under these circumstances, the baling head and the mechanism connected therewith up to the clutch will coast to a halt and will stop with the baling head in the region of its fully retracted position.

The baling head will now dwell in its retracted position until sufficient material accumulates on the gates 114 to cause them to swing open thereby actuating switch LS1 which will energize relay CR1 and again commence the baling head to move in its advancing direction, as described immediately above.

Normally, the baling head will advance and then retract and come to rest in its retracted position because the gates will close after the charge of material thereon has dropped into the baling chamber. However, should the supply of material be sufficient to hold the gates open, thus keeping limit switch LS1 closed, the baling head will continue to reciprocate until the material is pushed into the baling chamber and the gates can swing closed and release limit switch LS1. The baling head has a plate 19 attached to the top and extending rearwardly so that the hopper opening is closed except when the baling head is retracted.

It will be understood that this invention is susceptible to modification in order to adapt it to different usages and conditions; and, accordingly, it is desired to comprehend such modifications within this invention as may fall within the scope of the appended claims.

I claim:

1. In a baling machine having a frame, a baling chamber, a reciprocable baling head, a drive gear connected drivingly with the baling head, a drag link connecting said drive gear and baling head, a drive motor, a drive train connecting the drive motor with the gear, said drive train including a clutch engageable to complete the drive train and disengageable to interrupt the drive train, a brake pertaining to the portion of the drive train connected with the gear when the clutch is disengaged, a member connected to said clutch and movable for actuating said clutch, and means connecting said member with said brake for actuating said brake to cause said brake to be released simultaneously with movement of said member into position to cause engaging of the clutch and to cause releasing of said clutch, and a power operated actuator connected to said member for moving it from one of said positions to the other.

2. In a baling machine having a frame, a baling chamber, a hopper above said chamber, a reciprocable baling head, a drive gear connected drivingly with the baling head, a drag link connecting said drive gear with said baling head, a drive motor, a drive train connecting the drive motor with the gear, said drive train including a clutch engageable to complete the drive train and disengageable to interrupt the drive train, a brake pertaining to the portion of the drive train connected with the gear when the clutch is disengaged, a member for actuating said clutch, and means connecting said member with said brake for releasing said brake when the clutch is engaged and for engaging the brake when the clutch is released, said member being movable for engaging and disengaging the clutch and brake, and a fluid motor drivingly connected with the member for actuation thereof; said brake and clutch being simultaneously operable on the compressing and withdrawing cycle of said baling head.

3. In a baling machine; a baling chamber, a hopper connected with the chamber and extending upwardly therefrom for the supply of material to be baled to the chamber, a baling head reciprocable in said chamber, drive means connected with the baling head for reciprocating it between a retracted position on one side of the hopper and an advanced position on the other side of the hopper, control means responsive to the supply of material through the hopper for actuating the drive means for a complete advancing of the baling head followed by a retracting movement thereof, clutch and lever means operable during the retracting movement of said baling head for interrupting the power supply to said drive means when the baling head approaches its fully retracted position, and brake means being operated simultaneously with the said clutch means from the same said lever means, said control means causing the baling head to reciprocate in response to said supply of material.

4. In a baling machine; a baling chamber, a hopper connected with the chamber and extending upwardly therefrom for the supply of material to be baled to the chamber, a baling head reciprocable in said chamber, drive means connected with the baling head for reciprocating it between a retracted position on one side of the hopper and an advanced position on the other side of the hopper, a drag link connecting said baling head and drive means, control means responsive to the supply of material through the hopper for actuating the drive means for a complete advancing of the baling head followed by a retracting movement thereof, means operable during the retracting movement of said baling head for interrupting the power supply to said drive means when the baling head approaches its fully retracted position, said last mentioned means being arranged for being made ineffective by said control means in the event of a continued supply of material through said hopper, and brake means operable in response to said interruption of said power supply for braking said baling head to a halt, said interruption of power and braking of the baling head being effected simultaneously.

5. In a baling machine; a baling chamber, a baling head reciprocable in said chamber, a hopper above the chamber connected therewith to supply material to be baled to the chamber, normally closed gate means in the hopper responsive to the accumulation of a predetermined amount of material thereon to open so the material can pass downwardly in the hopper to the baling chamber, actuating means connected to said baling head for reciprocating said baling head, electrical means controlling said actuating means energizable for making said actuating means effective for causing reciprocation of said baling head, means responsive to the opening of said gate means for energizing said electrical means, and means operable during retracting movement of said baling head following closing of said gate means for deenergizing said electrical means, there being brake means pertaining to said baling head operable upon de-energization of said electrical means for braking said baling head to a halt; said actuating means also comprising electrical means to cause said baling head to repeat its compressing cycle when said gate means are open.

6. In a baling machine; a baling chamber, a baling head reciprocable in said chamber, a hopper above the chamber connected therewith to supply material to be baled to the chamber, normally closed gate means in the hopper responsive to the accumulation of a predetermined amount of material thereon to open so the material can pass downwardly in the hopper to the baling chamber, and actuating means connected to said baling head for reciprocating said baling head, a brake associated with said baling head, electrical means controlling said actuating means and brake energizable for making said actuating means effective and said brake ineffective for causing reciprocation of said baling head, means responsive to the opening of said gate means for energizing said electrical means, and means operable during retracting movement of said baling head following closing of said gate means for deenergizing said electrical means, said means operable during retracting movement of said baling head comprising switch means, and cam means movable with said baling head for actuating said switch means, said actuating means also including electrical means causing said baling head to repeat its compressing cycle when said gate means are open.

7. A baling machine comprising a baling chamber, a baling head which reciprocates in said chamber, a drive gear, a drag link connecting said baling head and drive gear, hopper above said chamber to supply material to be baled to said chamber, gate means in said hopper which are responsive to an accumulation of a predetermined amount of material so as to open when said amount of material has accumulated and thereby permit said material to pass downwardly in said chamber, a drive motor, a drive train connecting said drive gear and motor; said drive train comprising clutch, brake means, and lever means for simultaneously engaging said clutch and disengaging said brake means, said lever means also being capable of simultaneously disengaging said clutch means and engaging said brake means when the said baling head approaches a retracted position.

8. The baling machine described in claim 7, in which said brake means comprises a clutch housing, a cylindrical braking surface on said housing, a pair of braking arms, brake shoes attached to the upper ends of said arms, and operating means to keep said brake shoes in braking engagement with said housing when said clutch is disengaged from said drive train.

9. The baling machine described in claim 7, in which electrical means control said baling head, said electrical means comprising actuating means for causing reciprocation of said baling head, means responsive to the opening of said gate means, and means operable during the retracting movement of said baling head following the closing of said gate means to de-energize said electrical means thereby putting into operation said braking means.

References Cited in the file of this patent

UNITED STATES PATENTS

| | | |
|---|---|---|
| 1,791,356 | Greene | Feb. 3, 1931 |
| 1,826,289 | Shafer | Oct. 6, 1931 |
| 1,910,733 | Yingling | May 23, 1933 |
| 1,953,067 | Ballard | Apr. 3, 1934 |
| 2,648,415 | Neighbour et al. | Aug. 11, 1953 |
| 2,768,574 | Seltzer | Oct. 30, 1956 |
| 2,938,451 | Seltzer | May 31, 1960 |

FOREIGN PATENTS

| | | |
|---|---|---|
| 108,890 | Australia | Oct. 23, 1939 |